US006669892B2

(12) United States Patent
Ganguli et al.

(10) Patent No.: US 6,669,892 B2
(45) Date of Patent: Dec. 30, 2003

(54) METHOD FOR PREVENTING WARPAGE OF GEL PLATES DURING SINTERING

(76) Inventors: Rahul Ganguli, 3401 Calle Tecate, Camarillo, CA (US) 93012; Steven Colbern, 3401 Calle Tecate, Camarillo, CA (US) 93012

( * ) Notice: Subject to any disclaimer, the term of this patent is extended or adjusted under 35 U.S.C. 154(b) by 159 days.

(21) Appl. No.: 10/006,983

(22) Filed: Dec. 4, 2001

(65) Prior Publication Data

US 2002/0092324 A1 Jul. 18, 2002

Related U.S. Application Data

(60) Provisional application No. 60/256,664, filed on Dec. 18, 2000.

(51) Int. Cl.[7] .............................................. C04B 35/624

(52) U.S. Cl. ....................... 264/621; 264/605; 264/607; 264/608; 264/673; 65/395; 65/17.2

(58) Field of Search ................................ 264/605, 607, 264/621, 673; 65/395, 17.2; 501/12

(56) References Cited

U.S. PATENT DOCUMENTS

| | | | | |
|---|---|---|---|---|
| 3,179,724 A | * | 4/1965 | Jones | 264/607 |
| 3,904,352 A | * | 9/1975 | Thurnauer et al. | 432/5 |
| 4,756,959 A | * | 7/1988 | Ito et al. | 428/323 |
| 4,801,318 A | | 1/1989 | Toki et al. | 65/18.1 |
| 5,236,483 A | | 8/1993 | Miyashita et al. | 65/17 |
| 6,139,666 A | * | 10/2000 | Fasano et al. | 156/85 |
| 6,447,712 B1 | * | 9/2002 | Dogan et al. | 264/608 |

FOREIGN PATENT DOCUMENTS

| | | |
|---|---|---|
| JP | 60046937 | 3/1985 |
| JP | 02279530 | 11/1990 |

OTHER PUBLICATIONS

Fries, R. and Moulson, A.J. (1994), Fabrication and Properties of an Anisotropic PZT/Polymer 0–3 Composite, Journal of Materials Science: Materials in Electronics 5:238–243.*

* cited by examiner

*Primary Examiner*—James Derrington

(57) ABSTRACT

A new method is disclosed for producing thin plates by sintering a thin gel plate (e.g., silica) made using a sol-gel process, which substantially eliminates warpage of the plate during the sintering step. Sintering a sol-gel based silica plate to a dense glass typically causes significant shrinkage, and this can cause the plate to curl, especially around its edges. This phenomenon is referred to as warpage. In the method of the invention, the sintering step is performed while the gel plate is mounted on a support surface, separated by a thin layer of refractory powder. At the high sintering temperature, the powder partially fuses and sticks to both the gel plate and the support surface, which prevents non-uniform stresses in the gel plate from warping the plate.

26 Claims, 2 Drawing Sheets

METHOD FOR PREVENTING WARPAGE OF GEL PLATES DURING SINTERING

This application claims the benefit of U.S. Provisional Application No. 60/256,664, filed Dec. 18, 2000.

BACKGROUND OF THE INVENTION

This invention relates generally to methods for sintering silica gel plates and, more particularly, to sintering methods that avoid warping the plates.

Near net shape processing of silica glass plates ordinarily includes a step of sintering. This sintering step can cause warpage in glass plates that are thin, e.g., plates having a length:thickness ratio greater than about 6:1. During sintering, the edges and corners of the plate experience substantially different stresses as compared to the other portions of the plate, and this non-uniform stress profile, in turn, can cause the plate to curve or warp. (See, e.g., C. J. Brinker and G. W. Scherer, "Sol-Gel Science," Academic Press, 1990.)

This curvature or warpage usually is detrimental to the final product, and its elimination requires the use of additional processing steps. One such additional processing step that has been used in the past is flattening the glass plate by hot-pressing the plate at a temperature near its melting point. In the case of fused silica, this melting point is quite high (about 1720° C.), and hot-pressing at such high temperatures can be considerably expensive.

Another procedure for eliminating warpage of the flat plate is to place a weight on the plate during the sintering step. One drawback to this procedure is that the gel can crack into pieces instead of shrinking uniformly. Moreover, because the weight is necessarily exposed to the same corrosive atmosphere as is the gel, it must be composed of a material that can withstand that atmosphere. In addition, the placement of a large weight on top of the plate can impede the diffusion of gas into the plate.

It should, therefore, be appreciated that there is a significant need for an improved method for sintering sol gel derived glass plates that avoids warpage and also avoids the processing difficulties mentioned above. The present invention provides such a method.

SUMMARY OF THE INVENTION

This invention resides in a method for preventing the warpage of gel plates during sintering. In accordance with the invention, a refractory powder is placed between the gel plate and an underlying support surface during the sintering step. The refractory powder partially fuses to both the gel plate and the support surface, to partially fix, or anchor, the gel plate and prevent it from warping. This anchoring takes place in-situ during the sintering process itself, such that a separate processing step is not required.

Preferably, the gel plate is a thin silica gel plate, and a silica-based powder is placed between the silica gel plate and an underlying support surface during the sintering step. The silica-based powder preferably has a sintering temperature between 1150 and 1450° Celsius, and more preferably, it sinters above the sintering temperature of the silica gel plate.

Other features and advantages of the invention should become apparent from the following description of the preferred embodiment, taken in conjunction with the accompanying drawing, which illustrates, by way of example, the principles of the invention.

BRIEF DESCRIPTION OF THE DRAWING

Embodiments of the present invention will now be described, by way of example only, with reference to the following drawings in which.

DETAILED DESCRIPTION OF THE PREFERRED METHOD

Figure 1:
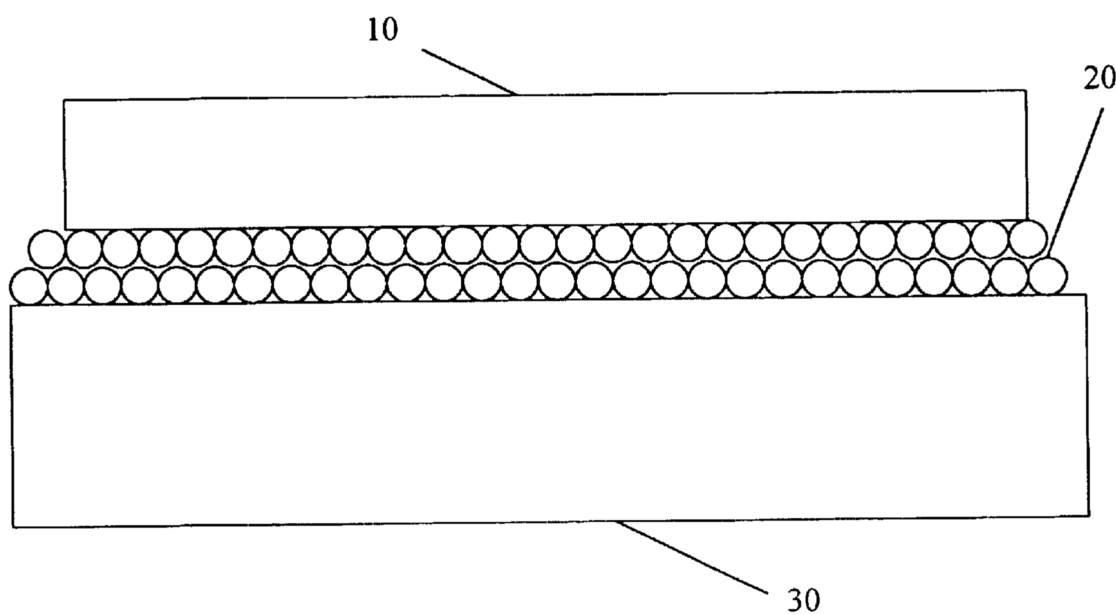
FIG. 1 is a simplified schematic illustration showing the placement of powdered fumed silica between a support surface and a silica gel plate before sintering of the gel plate.
Figure 2:
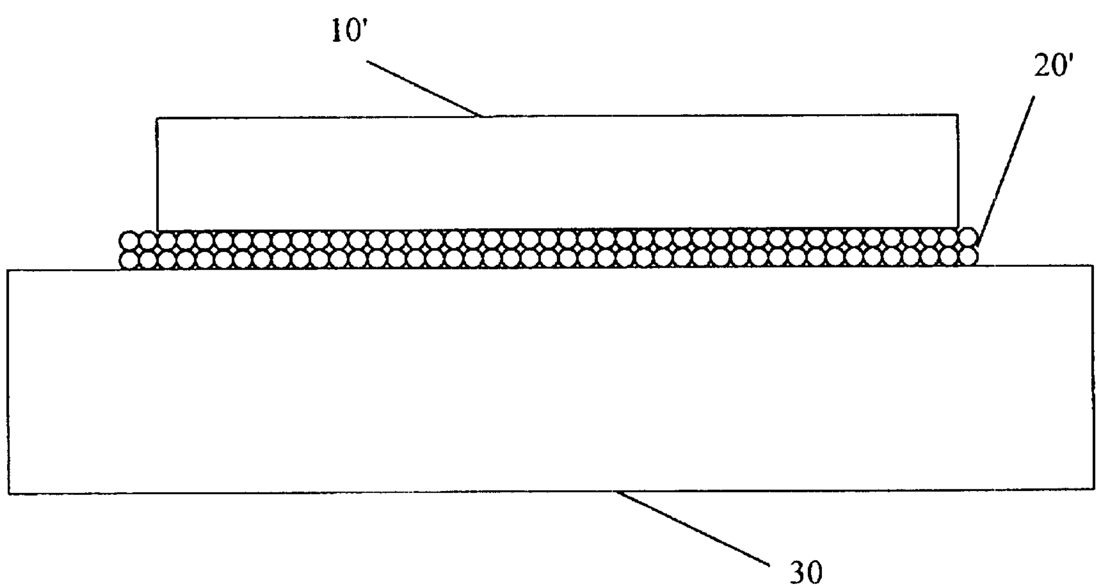
FIG. 2 is a simplified schematic illustration showing the placement of powdered fumed silica between a support surface and a silica gel plate after sintering of the gel plate of FIG. 1.

With reference now to FIGS. 1 and 2, there is shown a thin gel plate both before and after sintering into a dense glass surface, 10 and 10', respectively. The invention resides in a method for sintering this thin gel plate, while preventing non-uniform stresses in the plate from causing warpage. The thin gel plate is placed on a support surface 30 with an intermediate layer of refractory powder 20, e.g., alumina powders, silica-based powders, or ceramic powders, separating the two plates. The temperature of the thin gel plate then is elevated to a sintering temperature, to sinter the plate. At this elevated temperature, the refractory powder approaches and/or exceeds its sintering temperature and thereby partially fuses to both the support surface and the gel plate. This anchors the gel plate to the support surface and thereby prevents warpage. The sintered plate 10' then can be easily separated from the support surface.

The method is particularly advantageous in the sintering of thin gel plates formed of silica, and particularly thin silica gel plates derived from a sol-gel process. Most silica gels have a sintering temperature between 1150 and 1450° C., with the variation in sintering temperature chiefly due to variation in pore size. The refractory powder preferably has a sintering temperature between 1100 and 1500° C. In this application, the refractory powder preferably is a silica-based powder, such as, silica-based powders formed by fuming, precipitating, or sol-gel methods. For example, fumed silica powders, such as Aerosil OX-50 or Aerosil 200, both of which are available from DeGussa-Huls Aktiengesellschaft, can be beneficially used in conjunction with a silica gel. The refractory powder preferably has an average particle size between 10 nm and 500 $\mu$m. The layer of silica preferably has a uniform thickness of less than about 1.5 cm, and most preferably a uniform thickness of less than about 3 mm.

The method of the invention can best be understood by reference to the following examples:

EXAMPLE 1

A gel, of dimensions 17.5 cm×10.0 cm×1.5 cm, is made using know sol-gel methods, e.g., the methods disclosed in U.S. Pat. No. 5,236,483 to Miyashita, et al. and co-pending (and commonly assigned) U.S. patent application Ser. No. 09/516,668 filed by Ganguli, et al. The gel is subjected to a sintering procedure as described in the prior art, e.g., see, U.S. Pat. No. 4,801,318 to Told et al. During the sintering procedure, the gel is supported by a quartz glass support surface, with an intervening thin layer of Aerosil OX-50 fumed silica powder having a average particle size of 40 nm, supplied by DeGussa-Huls. The layer of powder has a thickness of less than about 1.5 cm, and preferably less than about 3 mm.

After the sintering step has been completed, the gel has shrunk to dimensions of 10.5 cm×6.0 cm×0.9 cm. This synthetic silica plate is free of any warpage. The plate typically is partially stuck to the supporting quartz plate, but it can be easily separated by inserting a small flat spatula between the two plates and applying a force normal to the plane of the plates.

EXAMPLE 2

The same gel as described in Example 1 is sintered according to the same sintering procedure as Example 1. In this Example 2, however, the gel is placed directly onto the quartz glass support surface, without the presence of any fumed silica powder. Upon sintering, the gel is cracked into several pieces and each piece is stuck to the support surface. Moreover, these stuck pieces cannot be easily removed.

This example shows that the gel cannot simply be placed on a glass support surface without a separating layer of fumed silica powder.

EXAMPLE 3

The same gel as described in Example 1 is sintered according to the same sintering procedure as Example 1, except that a 2 cm thick layer of Aerosil OX-50 silica powder is used to separate the gel from the quartz glass support surface. Upon sintering, the gel experiences significant warpage. This example shows that a layer of fumed silica powder that is too thick cannot prevent warpage in the sintered gel.

It should be appreciated from the foregoing description that the present invention provides a method for sintering sol-gel derived plates that avoids warpage without the need of additional process steps, thereby providing increased efficiency and leading to increased production of glass plates.

Although the invention has been described in detail with reference only to the presently preferred process, those of ordinary skill in the art will appreciate that various modifications can be made without departing from the invention. Accordingly, the invention is defined only by the following claims.

We claim:

1. A method for sintering a thin gel plate, comprising:

placing a layer of refractory powder on a support surface;

placing a thin gel plate on the layer of refractory powder;

elevating the temperature of the thin gel plate to a sintering temperature, to sinter the plate, wherein the refractory powder partially fuses, to anchor the gel to the support surface and prevent non-uniform stresses in the plate from warping the sintered plate; and separating the sintered plate from the support surface.

2. A method as defined in claim 1, wherein the thin gel plate is a silica gel plate.

3. A method as defined in claim 2, wherein the thin silica gel plate is derived from a sol-gel process.

4. A method as defined in claim 1, wherein the refractory powder has a sintering temperature within a range of 1100 to 1500 degrees Celsius.

5. A method as defined in claim 1, wherein the refractory powder sinters above the sintering temperature of the gel plate.

6. A method as defined in claim 1, wherein the refractory powder is a silica-based powder.

7. A method as defined in claim 6, wherein the silica-based powder has a particle size between 10 nm and 500 $\mu$m.

8. A method as defined in claim 6, wherein the silica-based powder is derived by fuming, precipitating, or sol-gel processes.

9. A method as defined in claim 6, wherein the layer of silica-based powder has a uniform thickness of less than about 1.5 cm.

10. A method as defined in claim 9, wherein the layer of silica-based powder has a uniform thickness of less than about 3 mm.

11. A method for sintering a thin gel plate, comprising:

placing a layer of ceramic powder on a support surface;

placing a thin gel plate on the layer of ceramic powder;

elevating the temperature of the thin gel plate to a sintering temperature, to sinter the plate, wherein the ceramic powder partially fuses, to anchor the gel to the support surface and prevent non-uniform stresses in the sintered plate from warping the plate; and separating the sintered plate from the support surface.

12. A method as defined in claim 11, wherein the thin plate is a silica gel plate.

13. A method as defined in claim 12, wherein the thin silica gel plate is derived from a sol-gel process.

14. A method as defined in claim 11, wherein the ceramic powder is fumed silica powder.

15. A method as defined in claim 14, wherein the layer of fumed silica has a uniform thickness of less than about 1.5 cm.

16. A method as defined in claim 15, wherein the layer of fumed silica has a uniform thickness of less than about 3 mm.

17. A method for sintering a thin silica gel plate, comprising:

placing a layer of silica-based powder on a support surface;

placing a thin silica gel plate on the layer of silica-based powder;

elevating the temperature of the silica gel plate to a sintering temperature, to sinter the plate, wherein the silica-based powder partially fuses, to anchor the gel to the support surface and prevent non-uniform stresses in the sintered plate from warping the sintered plate; and separating the sintered plate from the support surface.

18. A method as defined in claim 17, wherein the thin silica gel plate is derived from a sol-gel process.

19. A method as defined in claim 17, wherein the silica-based powder is derived by fuming, precipitating, or sol-gel processes.

20. A method as defined in claim 17, wherein the silica-based powder has a sintering temperature within a range of 1100 to 1500 degrees Celsius.

21. A method as defined in claim 17, wherein the silica-based powder sinters at the sintering temperature of the silica gel plate.

22. A method as defined in claim 17, wherein the silica-based powder sinters above the sintering temperature of the silica gel plate.

23. A method as defined in claim 17, wherein the refractory powder has a particle size between 10 nm and 500 $\mu$m.

24. A method as defined in claim 17, wherein the support surface is a quartz glass support surface.

25. A method as defined in claim 17, wherein the layer of silica-based powder has a uniform thickness of less than about 1.5 cm.

26. A method as defined in claim 23, wherein the layer of silica-based powder has a uniform thickness of less than about 3 mm.

* * * * *